United States Patent
Wang

Patent Number: 5,594,834
Date of Patent: Jan. 14, 1997

[54] METHOD AND SYSTEM FOR RECOGNIZING A BOUNDARY BETWEEN SOUNDS IN CONTINUOUS SPEECH

[75] Inventor: Shay-Ping T. Wang, Long Grove, Ill.

[73] Assignee: Motorola, Inc., Schaumburg, Ill.

[21] Appl. No.: 315,474

[22] Filed: Sep. 30, 1994

[51] Int. Cl.$^6$ .................................................. G10L 9/00
[52] U.S. Cl. ........................ 395/2.62; 395/2.6; 395/2.64
[58] Field of Search ................................. 395/2.62–2.66, 395/2.6, 2.49, 2.5, 2.4; 381/41, 43

[56] References Cited

U.S. PATENT DOCUMENTS

| | | | |
|---|---|---|---|
| 4,624,008 | 11/1986 | Vensko et al. | 381/43 |
| 4,718,093 | 1/1988 | Brown | 381/43 |
| 4,761,815 | 8/1988 | Hitchcock | 381/43 |
| 4,852,172 | 7/1989 | Taguchi | 381/43 |
| 4,852,180 | 7/1989 | Levinson | 381/43 |
| 5,072,452 | 12/1991 | Brown et al. | 381/43 |
| 5,073,867 | 12/1991 | Murphy et al. | 395/27 |
| 5,239,594 | 8/1993 | Yoda | 382/15 |
| 5,247,584 | 9/1993 | Krogmann | 382/14 |
| 5,299,284 | 3/1994 | Roy | 395/22 |
| 5,305,422 | 4/1994 | Jungua | 395/2.62 |
| 5,329,608 | 7/1994 | Bocchieri et al. | 395/2.52 |
| 5,365,592 | 11/1994 | Horner et al. | 381/46 |
| 5,369,726 | 11/1994 | Kroeker et al. | 381/43 |
| 5,404,422 | 4/1995 | Sakamoto et al. | 395/2.41 |
| 5,450,522 | 9/1995 | Hermansky et al. | 395/2.2 |

OTHER PUBLICATIONS

Polynominal and Standard Higher Order Neural Network, Chir–Ho Chang, Jin–Ling Lin, and J. Y. Cheung, Electrical Engineering and Computer Science, University of Oklahoma, 1993 IEEE International Conference on Neural Networks, Mar. 28–Apr. 1, 1993, pp. 989–994.

An Artificial Neural Networks For Approximating Polynomial Functions, Benham Malakooti et al., International Joint Conference on Neural Networks, Jun. 1992, pp. III 966–III 971.

On the Design Principles of the Functional Link Nets, Jun Wang et al., IEEE International Conference on Systems Engineering, Aug. 9–11, 1990, pp. 613–616.

A Neural Feed–Forward Network With a Polynomial Nonlinearity, Nils Hoffman, Neural Networks for Signal Processing Proceedings of the IEEE–Speech Worksheet, Aug. 31–Sep. 2, 1992.

Fundamentals of Speech Recognition, Lawrence Rabiner et al., Prentice Hall, 1993, pp. 122–132.

Speech Recognition by Computer, Stephen E. Levinson et al., Scientific American, Basic Recognizer Architecture, Jul. 1988, pp. 64–76.

On the Use of Bandpass Liftering in Speech Recognition, Biing–Hwang Juang et al., IEEE Transactions on Acoustics, Speech and Signal Processing, vol. ASSP–35 No. 7, Jul. 1987, pp. 947–953.

Modeling systems with Polynomial Networks, Tools for Predicting Behavior, Peter D. Varhol, Programmer's Workbench, Dr. Dobb's Journal, Sep. 1993, Begins on p. 76.

Speech Coding and Recognition: A Review, Andreas S. Spanias et al., IEICE Trans. Fundamentals, vol. E75–A, No. 2 Feb. 1992, pp. 132–148.

(List continued on next page.)

*Primary Examiner*—Kee M. Tung
*Attorney, Agent, or Firm*—Michael K. Lindsey; Bruce E. Stuckman

[57] ABSTRACT

Boundaries of spoken sounds in continuous speech are identified by classifying delimitative sounds to provide improved performance in a speech-recognition system. Delimitative sounds, those portions of continuous speech that occur between two spoken sounds, are recognized by the same method used to recognize spoken sounds. Recognition of delimitative sounds is accomplished by training a learning machine to act as a classifier which implements a discriminant function based on a polynomial expansion.

15 Claims, 3 Drawing Sheets

OTHER PUBLICATIONS

Polynomial Functions Can Be Realized by Finite Size Multilayer Feedforward Neural Networks, Naohiro Toda Ken–ichi Funahashi and Shiro usui, Department of Information and Computer Sciences, Toyohashi University of Technology, Tempaku, Toyohashi 441, Japan, 1991 IEEE International Joint Conference on Neural Networks, vol. 1 of 3, The Westin Stamford and Westin Plaza, 18–21, Nov. 1991, Singapore.

Robot Kinematics Learning Computations Using Polynominal Neural Networks, C. L. Philip Chen and A. D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638–2643.

Highly–automated, Non–parametric statistical learning for autonomous target recognition, Keith C. Drake, AbTech Corporation, 700 Harris Street, Charlottesville, Virginia 22903, pp. 1–10, Proceedings of the SPI 20th Applied Imagery Pattern Recognition Workshop, Oct. 1991, McLean, Virginia.

Pattern Recognition: Statistical Structural and Neural Approaches, Robert J. Schalkoff, Clemson University, 1992, pp. 340–342.

Pattern Recognition Engineering, Morton Nadler et al., A Wiley–Interscience Publication, 1993, pp. 294–319, 372–377.

A Polynomial Time Algorithm for Generating Neural Networks for Classification Problems, Asim Roy et al., IJCNN, 1992, pp. I–147–I–152.

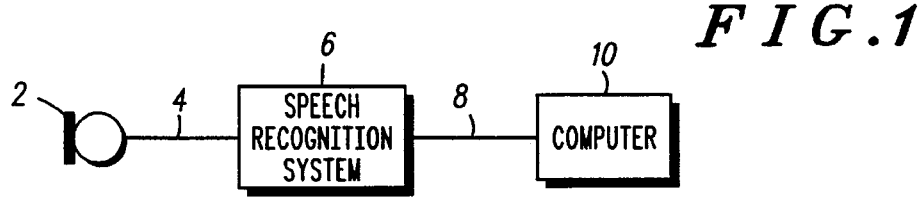
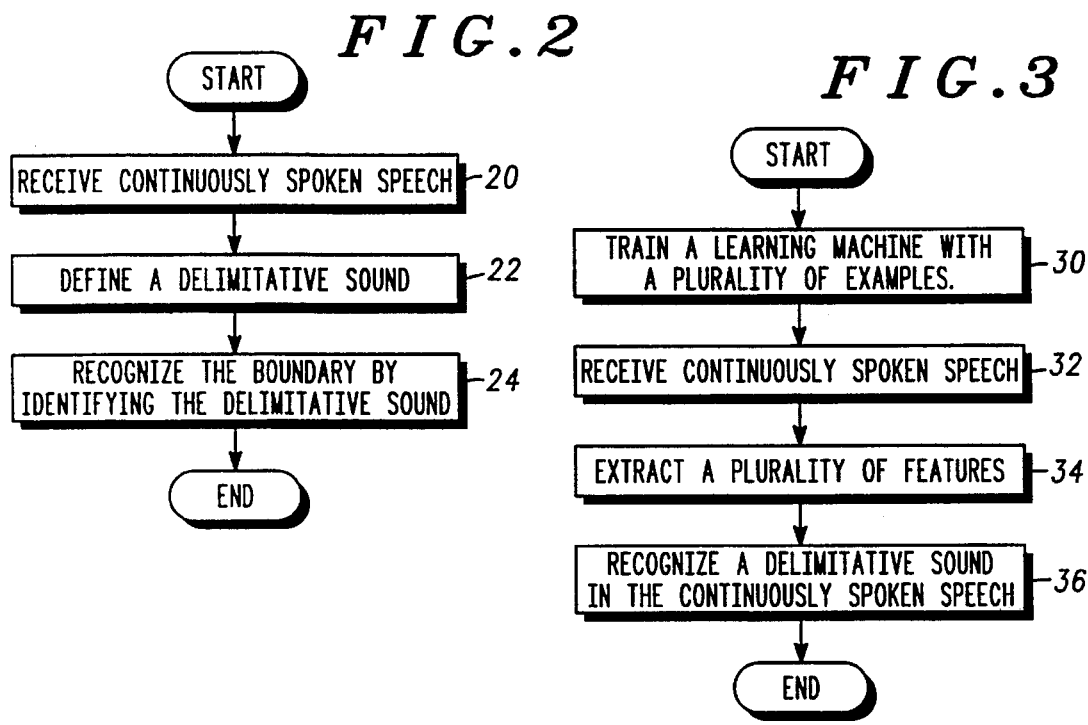
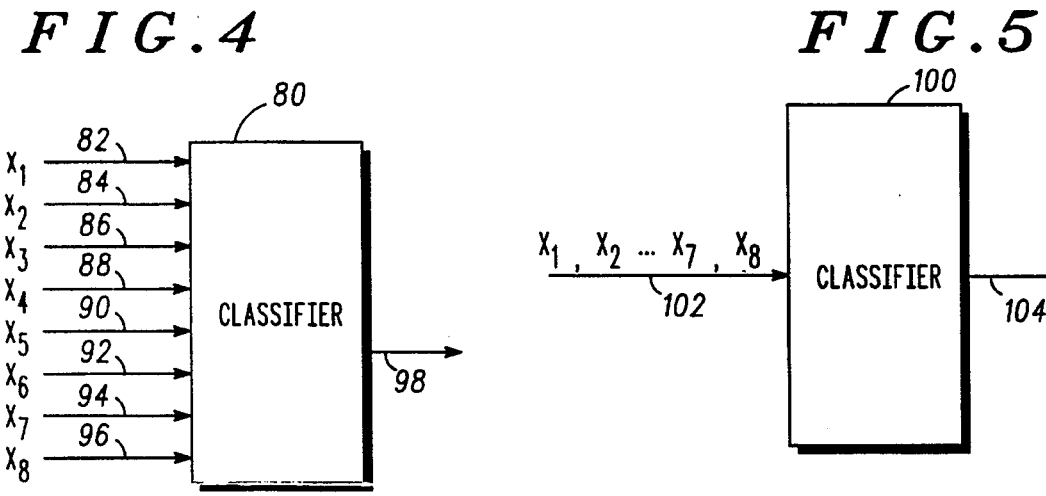

METHOD AND SYSTEM FOR RECOGNIZING A BOUNDARY BETWEEN SOUNDS IN CONTINUOUS SPEECH

RELATED INVENTIONS

The present invention is related to the following invention which is assigned to the same assignee as the present invention:

(1) "Neural Network and Method of Using Same", having Ser. No. 08/076,601, filed on Jun. 14, 1993.

(2) "Speech-Recognition System Utilizing Neural Networks and Method of Using Same", having Ser. No. 08/254,844, filed on Jun. 6, 1994.

(3) "System for Recognizing Spoken Sounds from Continuous Speech and Method of Using Same", having Ser. No. 08/302,067, filed on Sep. 7, 1994.

The subject matter of the above-identified related invention is hereby incorporated by reference into the disclosure of this invention.

TECHNICAL FIELD

This invention relates generally to speech-recognition systems and, in particular, to a method and system for identifying continuous speech.

BACKGROUND OF THE INVENTION

For many years, scientists have been trying to find a means to simplify the interface between man and machine. Input devices such as the keyboard, mouse, touch screen, and pen are currently the most commonly used tools for implementing a man/machine interface. However, a simpler and more natural interface between man and machine may be human speech. A device which automatically recognizes speech would provide such an interface.

Applications for an automated speech-recognition device include a database query technique using voice commands, voice input for quality control in a manufacturing process, a voice-dial cellular phone which would allow a driver to focus on the road while dialing, and a voice-operated prosthetic device for the physically disabled.

Unfortunately, automated speech recognition is not a trivial task. One reason is that speech tends to vary considerably from one person to another. For instance, the same word uttered by several persons may sound significantly different due to differences in accent, speaking speed, gender, or age. In addition to speaker variability, co-articulation effects, speaking modes (shout/whisper), and background noise present enormous problems to speech-recognition devices.

Since the late 1960's, various methodologies have been introduced for automated speech recognition. While some methods are based on extended knowledge with corresponding heuristic strategies, others rely on speech databases and learning methodologies. The latter methods include dynamic time-warping (DTW) and hidden-Markov modeling (HMM). Both of these methods, as well as the use of time-delay neural networks (TDNN), are discussed below.

Dynamic time-warping is a technique which uses an optimization principle to minimize the errors between an unknown spoken word and a stored template of a known word. Reported data shows that the DTW technique is very robust and produces good recognition. However, the DTW technique is computationally intensive. Therefore, it is currently impractical to implement the DTW technique for real-world applications.

Instead of directly comparing an unknown spoken word to a template of a known word, the hidden-Markov modeling technique uses stochastic models for known words and compares the probability that the unknown word was generated by each model. When an unknown word is uttered, the HMM technique will check the sequence (or state) of the word, and find the model that provides the best match. The HMM technique has been successfully used in many commercial applications; however, the technique has many drawbacks. These drawbacks include an inability to differentiate acoustically similar words, a susceptibility to noise, and computational intensiveness.

Recently, neural networks have been used for problems that are highly unstructured and otherwise intractable, such as speech recognition. A time-delay neural network (TDNN) is a type of neural network which addresses the temporal effects of speech by adopting limited neuron connections. For limited word recognition, a TDNN shows slightly better result than the HMM method. However, a TDNN suffers from two serious drawbacks.

First, the training time for a TDNN is very lengthy, on the order of several weeks. Second, the training algorithm for a TDNN often converges to a local minimum, which is not the globally optimum solution.

In summary, the drawbacks of existing known methods of automated speech-recognition (e.g. algorithms requiring impractical amounts of computation, limited tolerance to speaker variability and background noise, excessive training time, etc.) severely limit the acceptance and proliferation of speech-recognition devices in many potential areas of utility. There is thus a significant need for an automated speech-recognition system which provides a high level of accuracy, is immune to background noise, does not require repetitive training or complex computations, and is insensitive to differences in speakers.

SUMMARY OF INVENTION

It is therefore an advantage of the present invention to maintain a high degree of recognition accuracy by providing a method for isolating spoken sounds from continuous speech. The method recognizes boundaries between spoken sounds, thereby vastly increasing the likelihood of correctly identifying spoken sounds.

Another advantage of the present invention is to provide a method and system for training a learning machine to identify spoken sounds from continuous speech wherein the method and system do not require a repetitive or lengthy training period.

A further advantage of the present invention is to provide a system which allows boundaries between spoken sounds in continuous speech to be identified in the same manner that spoken sounds are identified, thus reducing the overall complexity of the system.

These and other advantages are achieved in accordance with a preferred embodiment of the invention by providing a system for recognizing a plurality of spoken sounds from continuously spoken speech. The system includes a method for recognizing a boundary between two spoken sounds in the continuously spoken speech. In turn, the method has the following steps. First, the continuously spoken speech is received. Next, a delimitative sound, which includes the boundary, is defined as being one of the spoken sounds.

Finally, the boundary is recognized by identifying the delimitative sound in the continuously spoken speech.

In another embodiment of the present invention there is provided a speech-recognition system which includes a recognition means. The recognition means receives a plurality of features extracted from continuously spoken speech, and in turn, identifies a delimitative sound in the continuously spoken speech by applying a classifier to the plurality of features.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a contextual diagram of a speech-recognition system used in one embodiment of the present invention.

FIG. 2 shows a flow diagram of a method of identifying a delimitative sound from continuously spoken speech in accordance with a preferred embodiment of the present invention.

FIG. 3 shows a flow diagram of a method of using a learning machine to recognize a spoken sound in continuously spoken speech in accordance with one embodiment of the present invention.

FIG. 4 illustrates a classifier which receives a plurality of extracted features.

FIG. 5 illustrates a classifier which receives a sequence of extracted features.

DETAILED DESCRIPTION OF A PREFERRED EMBODIMENT

Figure 6:
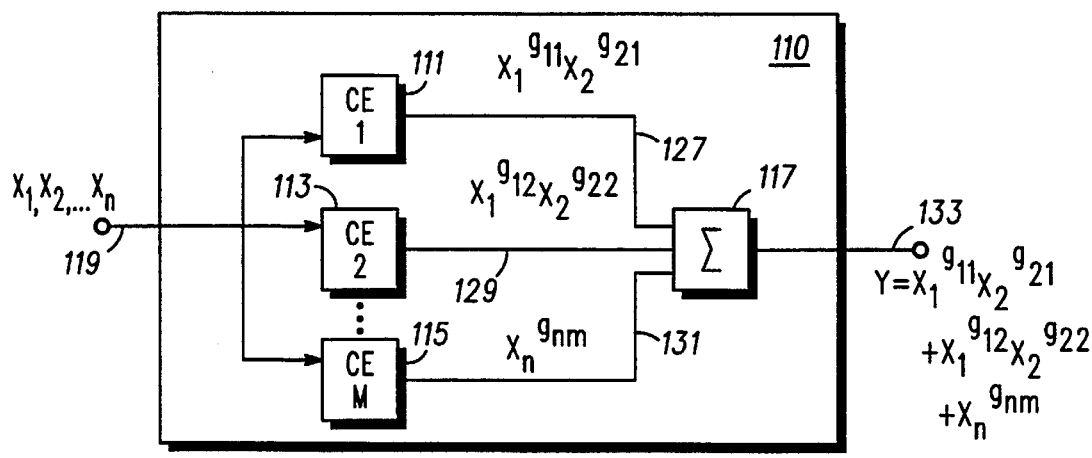
FIG. 6 is a block diagram of a classifier which is in accordance with a preferred embodiment of the present invention.

FIG. 1 shows a contextual block diagram of a speech-recognition system used in one embodiment of the present invention. The diagram shows microphone 2 or equivalent means for receiving audio input in the form of speech input and converting sound into electrical energy. Speech-recognition system 6 receives signals from microphone 2 over transmission medium 4 and performs various tasks such as waveform sampling, analog-to-digital (A/D) conversion, feature extraction and classification. Speech-recognition system 6 provides the identity of spoken sounds to computer 10 via bus 8. The method and system of the present invention are implemented in speech recognition system 6. Computer 10 executes commands or programs which may utilize the data provided by speech-recognition system 6.

One of ordinary skill will understand that speech-recognition system 6 may transmit spoken sound identities to devices other than a computer. For example, a communication network, data storage system, or transcription device could be substituted for computer 10.

The system depicted by FIG. 1 is used for recognizing spoken sound from continuously spoken speech. Continuously spoken speech, or continuous speech, takes place when a person speaking into the microphone does not un-naturally pause between each spoken sound. Rather, the person speaking pauses only when the natural form of speech dictates a pause, such as at the end of a sentence. For this reason, continuous speech can be thought of as "natural" speech which occurs in an ordinary conversation. Continuously spoken speech includes at least one spoken sound, wherein a spoken sound may be a word, syllable, or phoneme. A phoneme is the smallest element of speech sound which indicates a difference in meaning. A syllable includes one or more phonemes, and a word includes one or more syllable.

FIG. 2 shows a flow diagram of a method of identifying a delimitative sound from continuously spoken speech in accordance with a preferred embodiment of the present invention. In box 20, continuously spoken speech, which comprises at least one spoken sound, is received.

In box 22, a delimitative sound is defined. A delimitative sound is the portion of continuously spoken speech which occurs between two spoken sounds. Essentially, a delimitative sound contains the boundary between two spoken sounds which are included in continuously spoken speech. Next, in box 24, the boundary between two spoken sounds in the continuously spoken speech is recognized by identifying the delimitative sound. Although a delimitative sound does not represent a meaningful spoken sound, in this embodiment of the present invention the delimitation sound is identified using a means or method similar to that used for identifying a spoken sound.

FIG. 3 shows a flow diagram of a method of using a learning machine to recognize a spoken sound in continuously spoken speech in accordance with one embodiment of the present invention. A learning machine may be a neural network or any other system which may be inductively trained to classify patterns.

In box 30, the learning machine is trained with a plurality of spoken examples. In an embodiment of the present invention, the plurality of examples includes examples of delimitative sounds. A spoken example is defined as a set of given inputs and a desired output(s). For instance, a spoken example may include as given inputs a set of features extracted from continuous speech, and the example may include as desired output a binary code which represents the corresponding spoken sound in ASCII.

Training the learning machine transforms the learning machine into a device which is capable of classifying the data it receives; thus, in a preferred embodiment of the present invention, the trained learning machine is then capable of classifying a delimitative sound.

In box 32, continuously spoken speech is received. The continuously spoken speech typically includes a plurality of unidentified spoken sounds which are separated by delimitative sounds.

In box 34, a frame extractor extracts a plurality of features from the continuously spoken speech. As an example, the extracted features may include cepstral coefficients, predictive coefficients, or Fourier coefficients.

In box 36, at least one spoken sound is identified by classifying the features. When the continuously spoken speech includes spoken sounds which are separated by delimitative sounds, the delimitative sounds may also be identified in order to determine the boundaries of each spoken sound. Determining the boundaries of a spoken sound increases the probability of correctly identifying the spoken sound. Delimitative sounds are identified in the same manner as spoken sounds, that is, they are identified by classifying the features of the delimitation sounds.

Turning now to FIG. 4, a classifier which receives a plurality of extracted features is illustrated. Classifier 80 receives extracted features on its inputs 82, 84, 86, 88, 90, 92, 94, and 96. The features may be simultaneously received on the inputs. In the example shown, the set of features received by classifier 80 includes $x_0, x_1, \ldots x_8$ and may take the form of cepstrum, linear predictive, or Fourier coefficients.

In a preferred embodiment of the present invention, a parametric decision method is used by classifier 80 to determine whether a set of features belongs to a certain class. A class may represent spoken sound. Using a parametric decision method, classifier 80 implements a discriminant function $y(X)$, where $X=\{x_1, x_2, \ldots, x_i\}$ is the set of features and i is an integer index. Upon receiving a set of features, classifier 80 computes its respective discriminant function and produces the result on output 98. Generally, the magnitude of the result indicates whether a set of features belongs to the class which corresponds to the discriminant function. In a preferred embodiment of the present invention, the magnitude of the result is directly proportional to the likelihood that the set of features belongs to the corresponding class.

The discriminant function implemented by classifier 80 is based upon the use of a polynomial expansion and, in a loose sense, the use of an orthogonal function, such as a sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment of the present invention employs a polynomial expansion of which the general case is represented by Equation 1 as follows:

$$y = \sum_{i=1}^{m} w_{i-1} x_1^{g_{1i}} x_2^{g_{2i}} \ldots x_n^{g_{ni}} \qquad \text{Equation (1)}$$

where $x_i$ represent the classifier inputs and can be a function such as $x_i=f_i(z_j)$, wherein $z_j$ is any arbitrary variable, and where the indices i, j, and m are any integers; where y represents the output of the classifier; where $w_{i-1}$ represent the coefficient for the ith term; where $g_{1i}, \ldots, g_{ni}$ represent the exponents for the ith term and are integers; and n is the number of classifier inputs.

FIG. 5 illustrates a classifier which receives a sequence of extracted features. Each of the extracted features is fed across input 102 to classifier 100. Classifier 100 performs essentially the same functions as classifier 80 of FIG. 4. Classifier 100 provides the results of its operations on output 104. In the example shown, the set of features received by classifier 100 may include cepstrum, linear predictive, or Fourier coefficients.

FIG. 6 illustrates a block diagram of the classifier shown in FIG. 5 in accordance with a preferred embodiment of the present invention. Computer 110 implements classifier 100 of FIG. 5. Computer 110 includes a plurality of computing elements, of which computing elements 111, 113, and 115 are shown. Computer 110 also includes summation circuit 117.

A polynomial expansion is calculated by computer 110 in the following manner. A plurality of data inputs $x_1, x_2, \ldots, x_n$ are fed into computer 110 using bus 119 and then distributed to the plurality of computing elements, represented by 111, 113, and 115. Typically, the data inputs are extracted features. Each computing element computes a term in the polynomial expansion and determines which of the data inputs to receive. After computing a term, a computing element passes the term to summing circuit 117 which sums the terms computed by the computing elements and places the sum on computer output 133.

For example, FIG. 6 depicts the computation of the polynomial $y=x_1^{g_{11}}x_2^{g_{21}}+x_1^{g_{12}}x_2^{g_{22}} \ldots +x_n^{g_{nm}}$. Computing element 111 computes the term $x_1^{g_{11}}x_2^{g_{21}}$ and then sends it to summing circuit 117 over bus 127; computing element 113 computes the term $x_1^{g_{12}} x_2^{g_{22}}$ and then sends it to summing circuit 117 over bus 129; and computing element 115 computes the term $x_n^{g_{nm}}$ and then sends it to summing circuit 117 over bus 131. Upon receiving the terms from the computing elements, summing circuit 117 sums the terms and places the resulting polynomial expansion on computer output 133.

It will be apparent to one of ordinary skill that computer 110 is capable of computing polynomials of the form given by Equation 1 which have a number of terms different from the above example, and polynomials whose terms are composed of data inputs different from those of the above example.

In one embodiment of the present invention, the computer 110 is implemented by software running on a processor such as a microprocessor. However, one of ordinary skill in the art will recognize that a programmable logic array, ASIC or other digital logic device could also be used to implement the functions performed by the computer 110.

Figure 7:
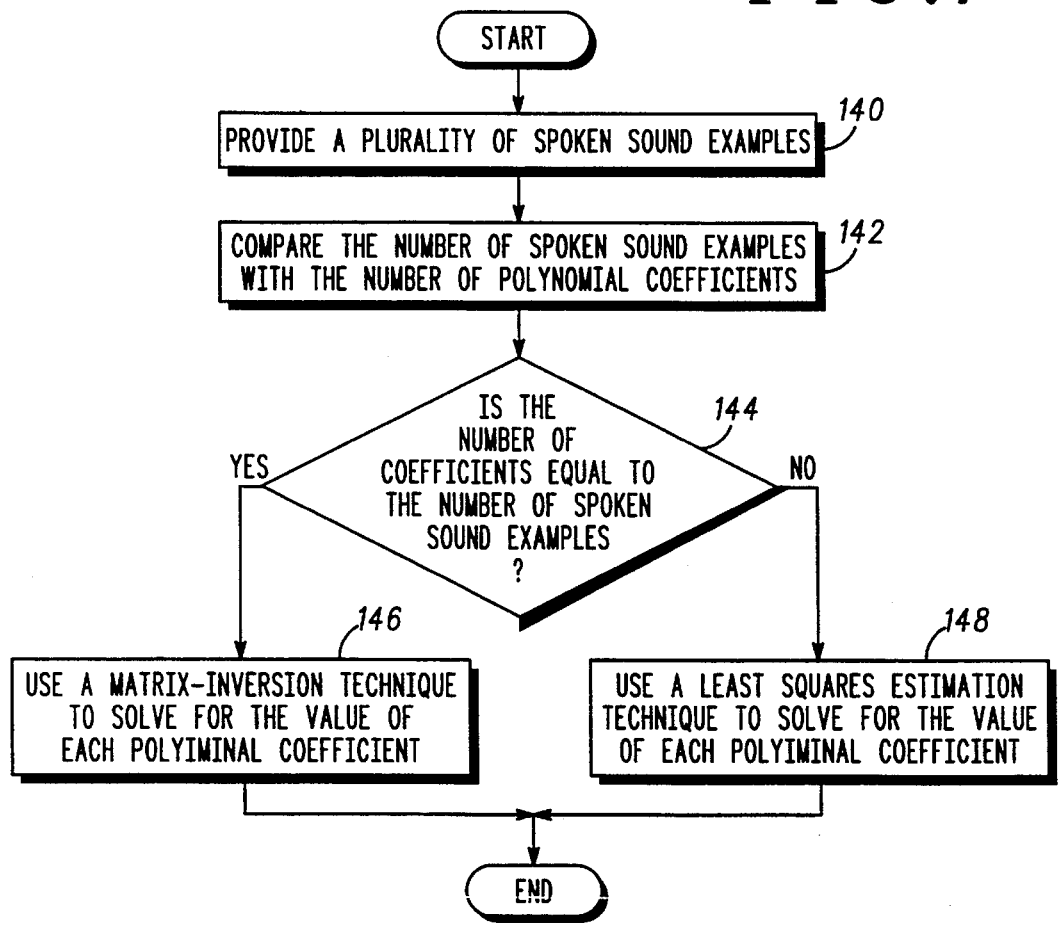
FIG. 7 shows a flow diagram of a method of training a speech-recognition system to identify spoken sounds from continuously spoken speech in accordance with a further embodiment of the present invention.
Figure 8:
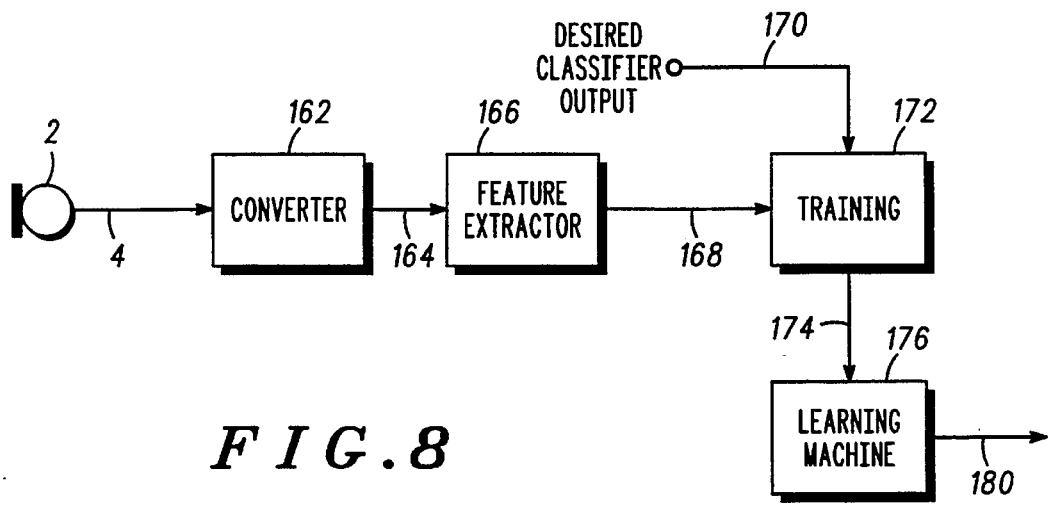
FIG. 8 shows a block diagram of a system to train a learning machine in accordance with an embodiment of the present invention.

FIG. 7 shows a flow diagram of a method of training a speech-recognition system to identify spoken sounds from continuously spoken speech in accordance with a further embodiment of the present invention. A speech-recognition system constructed in accordance with an embodiment of present invention has principally two modes of operation: (1) a training mode in which examples of spoken sounds are used to train learning machines, and (2) a recognition mode in which spoken sounds in continuous speech are identified. Referring to FIG. 8, generally, a user must train learning machine 176 by providing examples of all of the spoken sounds and delimitative sounds that the system is to recognize. In a preferred embodiment of the present invention, a learning machine may be trained to classify a delimitative sound by the same method used to train a learning machine to classify a spoken sound.

In an embodiment of the present invention, a learning machine may be trained to behave as a classifier by tuning the coefficients of a discriminant function which is based on a polynomial expansion of the form given by Equation 1. For the discriminant function to effectively classify input data, the coefficient, $w_{i-1}$, of each term in the polynomial expansion must be determined. This can be accomplished by the use of the following training method.

In box 140, a plurality of spoken examples is provided. A spoken example comprises two components. The first component is a set of samples of the spoken sound, or features extracted therefrom, and the second component is a corresponding desired classifier output signal.

Next, in box 142, the trainer compares the number of examples with the number of polynomial coefficients in the discriminate function.

In decision box 144, a check is made to determine whether the number of coefficients is equal to the number of spoken examples. If so, the method proceeds to box 146. If not, the method proceeds to box 148.

In box 146, a matrix inversion technique is used to solve for the value of each polynomial coefficient.

In box 148, a least squares estimation technique is used to solve for the value of each polynomial coefficient. Suitable least-squares estimation techniques include, for example, least-squares, extended least-squares, pseudo-inverse, Kalman filter, maximum-likelihood algorithm, Bayesian estimation, and the like.

In implementing a classifier which is usable in an embodiment of the present invention, one generally selects the number of computing elements in the classifier to be equal to or less than the number of examples presented to the learning machine.

FIG. 8 shows a block diagram of a system to train a learning machine in accordance with an embodiment of the present invention. Speech samples are received by microphone 2 and sent via transmission medium 4 to converter 162. A speech sample corresponds to the first component of a spoken example. Upon receiving a speech sample, converter 162 performs various functions which utilize the speech sample. These functions include waveform sampling, filtering, and analog-to-digital (A/D) conversion. Converter 162 generates as output a speech signal which is passed to feature extractor 166 via bus 164.

Feature extractor 166 produces a plurality of features from the speech signal. These features are passed to trainer 172 over bus 168. In addition to receiving features, trainer 172 receives desired classifier outputs over bus 170. Each desired classifier output that is received by trainer 172 corresponds to the features of a speech sample, which are provided over bus 168, thereby producing a spoken example which is then used by trainer 172 to compute polynomial coefficients, Trainer 172 computes polynomial coefficients according to the method shown in FIG. 7. These coefficients are passed across bus 174 to learning machine 176. Learning machine 176 utilizes the polynomial coefficients received over bus 174 to create a classifier. The classifier is available to recognition means 200 of FIG. 9 from learning machine 176 on bus 180.

When a user utters continuous speech, microphone 2 generates a signal which represents the acoustic waveform of the speech. Typically, the signal from microphone 2 is an analog signal. This signal is then fed to converter 162 for digitization. Converter 162 includes appropriate means for A/D conversion. An A/D converter may sample the signal from microphone 2 several thousand times per second (e.g. between 8000 and 14,000 times per second in a preferred embodiment of the present invention depending on the frequency components of the speech signal from the microphone). Each of the samples is then converted to a digital word, wherein the length of the word is between 12 and 32 bits.

Those of ordinary skill in the art will understand that the sampling rate and word length of A/D converters may vary and that the numbers given above do not place any limitations on the sampling rate or word length of the A/D converter which is included in an embodiment of the present invention.

The speech signal comprises one or more of these digital words, wherein each digital word represents a sample of the continuous speech taken at an instant in time. The speech signal is passed to feature extractor 166 where the digital words, over an interval of time, are grouped into a data frame. In a preferred embodiment of the present invention each data frame represents approximately 10 milliseconds of speech signal. However, one of ordinary skill in the art will recognize that other data frame durations may be used, depending on a number of factors such as the duration of the spoken sounds to be identified. The data frames are in turn subjected to cepstral analysis, a method of feature extraction, which is performed by feature extractor 166.

The cepstral analysis, or feature extraction, which is performed on the speech signal, results in a representation of the speech signal which characterizes the relevant features of the continuous speech over the interval of time. It can be regarded as a data reduction procedure that retains vital characteristics of the speech signal and eliminates undesirable interference from irrelevant characteristics of the speech signal, thus easing the decision-making process of the plurality of classifiers.

The cepstral analysis is performed as follows. First, a p-th order (typically p=12 to 14) linear prediction analysis is applied to a set of digital words from the speech signal to yield p prediction coefficients. The prediction coefficients are then converted into cepstrum coefficients using the following recursion formula:

$$c(n) = a(n) + \sum_{k=1}^{n-1} (1 - k/n) \, a(k) \, c(n-k) \qquad \text{Equation (2)}$$

wherein $c(n)$ represents the $n^{th}$ cepstrum coefficient, $a(n)$ represents the $n^{th}$ prediction coefficient, $1 \leq n \leq p$, p is equal to the number of cepstrum coefficients, n represents an integer index, and k represents an integer index, and $a(k)$ represents the $k^{th}$ prediction coefficient and $c(n-k)$ represents the $(n-k)^{th}$ cepstrum coefficient.

The vector of cepstrum coefficients is usually weighted by a sine window of the form, $$\alpha(n) = 1 + (L/2) \sin (\pi n/L) \qquad \text{Equation (3)}$$

wherein $1 \leq n \leq p$, and L is an integer constant, giving the weighted cepstrum vector, $C(n)$, wherein $$C(n) = c(n) \, \alpha(n) \qquad \text{Equation (4)}$$

This weighting is commonly referred to as cepstrum liftering. The effect of this liftering process is to smooth the spectral peaks in the spectrum of the speech signal. It has also been found that cepstrum liftering suppresses the existing variations in the high and low cepstrum coefficients, and thus considerably improves the performance of the speech-recognition system.

The result of the cepstral analysis is a smoothed log spectra which corresponds to the frequency components of the speech signal over an interval of time. The significant features of the speech signal are thus preserved in the spectra. Feature extractor 166 generates a respective feature frame which comprises data points from the spectrum generated from a corresponding data frame. The feature frame is then passed to trainer 172.

In a preferred embodiment of the present invention, a feature frame contains twelve data points, wherein each of the data points represents the value of the cepstrally-smoothed spectrum at a specific frequency over the interval of time. The data points are 32-bit digital words. Those skilled in the art will understand that the present invention places no limits on the number of data points per feature frame or the bit length of the data points; the number of data points contained in a feature frame may be twelve or any other appropriate value, while the data point bit length may be 32 bits, 16 bits, or any other value.

In one embodiment of the present invention, the system shown in FIG. 8 is implemented by software running on a -processor such as a microprocessor. However, one of ordinary skill in the art will recognize that a programmable logic array, ASIC or other digital logic device could also be used to implement the functions performed by the system shown in FIG. 8.

Figure 9:
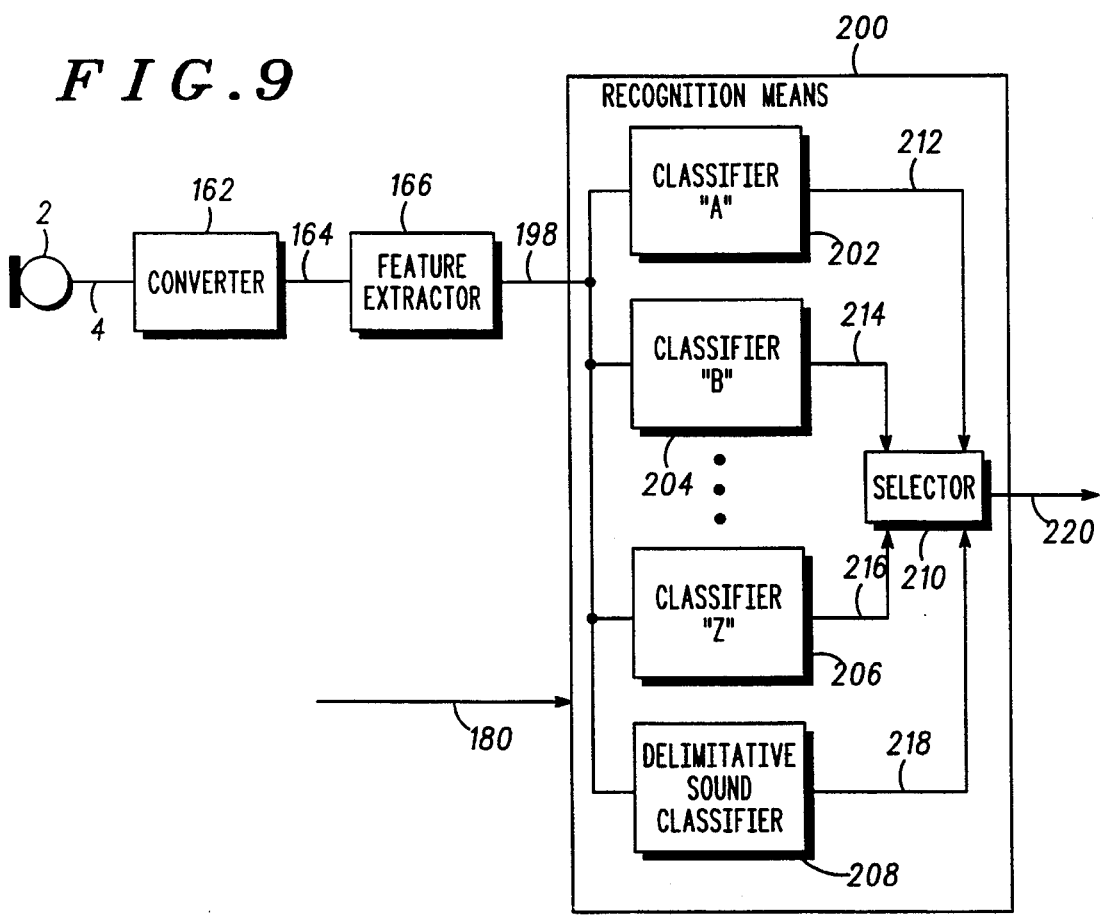
FIG. 9 illustrates a block diagram of a speech-recognition system which incorporates an embodiment of the present invention.

FIG. 9 illustrates a block diagram of a speech-recognition system which incorporates an embodiment of the present invention. The speech-recognition system comprises microphone 2, converter 162, feature extractor 166, and recognition means 200. Recognition means 200, in turn, includes a plurality of classifiers and a selector. Of the plurality of classifiers, classifiers 202, 204, and 206 are shown. Also shown is delimitative sound classifier 208. The classifiers are provided to recognition means 200 over bus 180 as described above for FIG. 8.

Continuous speech is received by microphone 2 and converted to signals which are transmitted across transmission medium 4 to converter 162. Converter 162 and feature extractor 166 perform the same functions and are connected by bus 164 in substantially the same manner as described above for FIG. 8. Feature extractor 166 generates a feature frame which is then distributed by bus 198 to a plurality of classifiers included in recognition means 200. In the example given by FIG. 9, four of the plurality of classifiers are shown.

Each classifier implements a different discriminate function. In the example shown, classifier 202 implements a discriminate function for the spoken sound which represents the character "A"; classifier 204 implements a discriminate function for the spoken sound which represents the character "B"; and classifier 206 implements a discriminate function for the spoken sound which represents the character "Z". Delimitative sound classifier 208 implements a discriminate function for a delimitative sound. The discriminate functions implemented by each of the classifiers in recognition means 200 is a polynomial expansion of the form given by Equation 1.

In the example, the result of the discriminate function implemented by classifier 202 is passed to selector 210 across bus 212; the result of the discriminate function implemented by classifier 204 is passed across bus 214 to selector 210; and the result of the discriminate function implemented by classifier 206 is passed across bus 216 to selector 210. In addition, the result of the discriminate function implemented by delimitative sound classifier 208 is passed across bus 218 to selector 210.

Selector 210 determines which of the classifier outputs has the largest magnitude and then produces a representation of the corresponding spoken sound identity on output 220. When the continuous speech comprises spoken sounds which are separated by delimitative sounds, the delimitative sounds must also be identified in order to determine the boundaries of each spoken sound. Determining the boundaries of a spoken sound increases the probability of correctly identifying the spoken sound. Delimitative sounds are identified in the same manner as spoken sounds, that is, they are identified by classifying features.

In one embodiment of the present invention, the system shown in FIG. 9 is implemented by software running on a processor such as a microprocessor. However, one of ordinary skill will recognize that a programmable logic array, ASIC, or other digital logic device could also be used to implement the functions performed by the system shown in FIG. 9.

SUMMARY

Thus there has been described herein a concept, as well as several embodiments including a preferred embodiment, of a method and system for identifying boundaries between spoken sounds in continuously spoken speech.

Because the various embodiments of methods and systems for identifying delimitative sounds in continuously spoken speech as herein-described do not require lengthy or repetitive training periods, they are more acceptable to users.

Additionally, the various embodiments of the present invention as herein-described allow delimitative sounds in continuous speech to be identified in the same manner that spoken sounds are identified, thus reducing the overall complexity and cost of a speech-recognition system.

It will be apparent to those skilled in the are that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a speech recognition system, a method for recognizing a boundary between two contiguous spoken sounds, the method comprising the steps of:

(a) training a learning machine, with a plurality of spoken examples, to classifiy a delimitative sound that represents the boundary;

(b) receiving the continuously spoken speech which includes the delimitative sound;

(c) extracting a plurality of features from the continuously spoken speech; and (d) recognizing the delimitative sound in the continuously spoken speech by classifying the plurality of features according to a polynomial discriminant function having a form $$y = \sum_{i=1}^{m} w_{i-1} x_1^{g_{1i}} x_2^{g_{2i}} \ldots x_n^{g_{ni}};$$

wherein y represents a classifier output, $w_{i-1}$ represents a coefficient of an ith term in the polynomial expansion, $x_1, x_2 \ldots x_n$ represent the plurality of features $g_{1i}, \ldots, g_{ni}$ represent exponents for the ith term in the polynomial expansion, and i, m, and n are integers.

2. The method of claim 1 wherein the learning machine includes a neural network.

3. The method of claim 1 wherein training the learning machine further includes a step of calculating a plurality of polynomial coefficients, the step of calculating comprises the following substeps:

(i) providing the plurality of spoken examples;

(ii) comparing the number of spoken examples in the plurality of spoken examples with the number of the terms in the at least one term of the polynomial expansion; and (iii) providing at least two techniques for calculating the plurality of polynomial coefficients, wherein (A) if the number of the terms is equal to the number of spoken examples, using a matrix-inversion technique to solve for each of the plurality of polynomial coefficients; and (B) if the number of terms is less than the number of spoken examples, using a least-squares estimation technique to solve for each the plurality of polynomial coefficients.

4. The method of claim 1 wherein the plurality of features corresponds to the continuously spoken speech during an interval of time having a duration.

5. The method of claim 4 wherein the duration of the interval of time is 10 milliseconds.

6. The method of claim 1 wherein the plurality of features is selected from the group consisting of cepstral coefficients, predictive coefficients, and Fourier coefficients.

7. A speech-recognition system comprising:
- a converter for generating a speech signal representing continuously spoken speech;
- a feature extractor for extracting a plurality of features from the speech signal; and
- a classifier for identifying a delimitative sound representing a boundary between two contiguous sounds in the continuously spoken speech, the classifier classifying the plurality of features according to a polynomial discriminant function having a form $$y = \sum_{i=1}^{m} w_{i-1} x_1^{g_{1i}} x_2^{g_{2i}} \ldots x_n^{g_{ni}};$$

wherein y represents a classifier output, $w_{i-1}$ represents a coefficient of an ith term in the polynomial expansion, $x_1, x_2, \ldots, x_n$ represent the plurality of features, $g_{1i}, \ldots, g_{ni}$ represent exponents for the ith term in the polynomial expansion, and i, m, and n are integers.

8. The speech-recognition system recited in claim 7 further comprising:
- a learning machine for providing the classifier;
- a trainer which is operatively coupled to the learning machine, for training the learning machine in order to provide the classifier, the trainer receiving a plurality of spoken examples.

9. The speech-recognition system of claim 8 wherein the trainer calculates coefficients of a polynomial expansion having at least one term, the trainer comprising:
- comparing means for comparing the number of spoken examples with the number of terms in the polynomial expansion; and
- providing means, operatively coupled to the comparing means, for providing at least two techniques for calculating the coefficients, wherein
  (i) if the number of terms is equal to the number of spoken examples, providing a matrix-inversion technique to solve for the coefficients;
  (ii) if the number of terms is less than the number of spoken examples, providing a least-squares estimation technique to solve for the coefficients.

10. The speech-recognition system of claim 7 wherein the recognition means includes a neural network.

11. The speech-recognition system of claim 7 wherein the plurality of features corresponds to the continuously spoken speech during an interval of time having a duration.

12. The speech-recognition system of claim 11 wherein the duration of the interval of time is 10 milliseconds.

13. The speech-recognition system of claim 7 wherein the plurality of features is selected from the group consisting of cepstral coefficients, predictive coefficients, and Fourier coefficients.

14. The speech-recognition system of claim 7 for identifying a plurality of spoken sounds from the continuously spoken speech, further comprising:
- a plurality of classifiers for classifying the plurality of spoken sounds, each of the plurality of classifiers having a corresponding class and implementing a discriminant function which uses the plurality of features to produce a result which indicates the likelihood of one of the plurality of spoken sounds belonging to the corresponding class; and
- a selector, operatively coupled to each of the plurality of classifiers, for identifying of a spoken sound included in the plurality of spoken sounds by comparing the results from each of the plurality of classifiers.

15. The speech-recognition system of claim 14 wherein at least one of the plurality of classifiers classifies the delimitative sound.

* * * * *